United States Patent [19]
Minkoff

[11] 3,935,137
[45] Jan. 27, 1976

[54] PAINT COMPOSITION CONTAINING DENATONIUM BENZOATE AND LATEX RESIN BINDER FOR APPLICATION OVER OLD PAINT FILMS TO PREVENT INGESTION OF POISONS THEREFROM

[75] Inventor: Walter Minkoff, Rockville Centre, N.Y.

[73] Assignee: Peerless Paint and Varnish Corporation, Brooklyn, N.Y.

[22] Filed: Apr. 15, 1974

[21] Appl. No.: 460,875

Related U.S. Application Data

[63] Continuation of Ser. No. 345,071, March 26, 1973, abandoned, which is a continuation-in-part of Ser. No. 267,623, June 29, 1972, abandoned, which is a continuation-in-part of Ser. No. 115,796, Feb. 16, 1971, abandoned.

[52] U.S. Cl. .......... 260/17 R; 252/365; 260/29.6 E; 260/29.6 ME; 260/29.6 WA; 260/31.6; 424/10; 424/32; 424/33
[51] Int. Cl.² C08K 5/10; C09K 3/00; C08L 31/04; C08L 1/26
[58] Field of Search ............... 106/287, 176, 197 R; 424/10, 32, 33; 260/29.6 E, 29.6 WA, 29.6 ME, 31.6, 17; 252/365, 366

[56] References Cited
UNITED STATES PATENTS

| | | | |
|---|---|---|---|
| 3,080,327 | 3/1963 | Hay | 252/365 |
| 3,268,577 | 8/1966 | Hay | 252/366 |
| 3,301,829 | 1/1967 | Woodward | 260/29.6 E |
| 3,312,652 | 4/1967 | Coney et al. | 260/29.6 |
| 3,652,313 | 3/1972 | Nagata et al. | 106/193 |
| 3,663,253 | 5/1972 | Stone | 106/204 |

FOREIGN PATENTS OR APPLICATIONS

| | | | |
|---|---|---|---|
| 371,196 | 4/1932 | United Kingdom | 106/169 |

OTHER PUBLICATIONS

The Condensed Chem. Dictionary – 7th Ed., p. 392.
The Condensed Chem. Dictionary – 8th Ed., pp. 24, 265–266, and 833.
Hackh's Chem. Dict. – 4th Ed., p. 202.
The Merck Index. – 8th Ed., p. 328.

*Primary Examiner*—Donald E. Czaja
*Assistant Examiner*—Edward Woodberry
*Attorney, Agent, or Firm*—Stevens, Davis, Miller & Mosher

[57] ABSTRACT

A coating composition for application to surfaces previously coated with lead paint or other poisonous substances comprising a paint containing a bitter tasting component such as denatonium benzoate. This coating composition has a repulsive taste and an appearance similar to ordinary paints so that it will impart an unpleasant taste experience to a child who mouths surfaces or chips coated with it and will condition the child to avoid mouthing surfaces or chips of similar appearance.

11 Claims, No Drawings

PAINT COMPOSITION CONTAINING DENATONIUM BENZOATE AND LATEX RESIN BINDER FOR APPLICATION OVER OLD PAINT FILMS TO PREVENT INGESTION OF POISONS THEREFROM

CROSS REFERENCE TO RELATED APPLICATION

This application is a continuation of application Ser. No. 345,071, filed Mar. 26, 1973 and now abandoned, which is a continuation-in-part of U.S. Pat. application Ser. No. 267,623, filed June 29, 1972, now abandoned, which in turn is a continuation-in-part of U.S. Pat. application Ser. No. 115,796 filed Feb. 16, 1971 and now abandoned.

BACKGROUND OF THE INVENTION

This invention relates to coating compositions and, in particular, to coatings for rendering previously applied toxic coatings less harmful to persons, particularly children who might be tempted to suck, chew, swallow, or otherwise mouth surfaces, chips, or peelings coated with such toxic subtances.

Many paints used on the interior surfaces of houses and rental apartments painted before World War II contained lead compounds and other toxic compounds and substances. In older dwelling units, especially the inadequately maintained units prevalent in poorer neighborhoods, the paints are loose and peeling. The fallen chips often fall into the hands of children living in these units, exposing them to lead poisoning. Further, many of these children have a history of pica, a disorder characterized by a tendency to eat non-food items such as paint chips, plaster and dirt. These children commonly chew even on intact paint surfaces. The number of children who thus become chronically ill or who die is not accurately known but is said by authoritative sources to be appreciable.

A number of proposals have been made for correcting this condition. These include:

1. Tearing down and replacing walls and ceilings coated with lead paints.
2. Canvassing, panelling or otherwise resurfacing old walls, ceilings and woodwork that have been coated with such paints.
3. Burning, scraping, dissolving or otherwise removing lead paints from interior surfaces in swelling units likely to be inhabited by children.

All of these proposals require considerable expense, time and, in some cases, involve significant structural changes in the building itself. Accordingly, it is an object of my invention to provide a simple, relatively inexpensive and quick method of keeping children who might be tempted to injest these poisonous substances away from toxic paint films. An additional object is to reduce the occurrence of pica by conditioning children, through an unpleasant taste experience, to avoid non-food items resembling paint chips or surfaces. My paint, that to the child should be indistinguishable from ordinary paints until he tastes it, will condition him by the unpleasant taste experience it imparts not to mouth even the ordinary paint films he encounters. It should thus correct his pica behaviour in regard to paint films and painted objects. The paint is also practically identical in properties of application, durability, appearance and service to presently used paints so as to make its use economical and practical given the high labor costs of application and minimize the frequency of application with its attendant cost and inconvenience.

SUMMARY OF THE INVENTION

In accordance with my invention, I provide a coating composition for application to previously coated substrates, such as walls and ceilings, which comprises a paint containing an effective amount of an additive such as a bitter tasting component which renders the coating composition unpleasant to the taste. The previously coated substrate will generally have been painted with a compound containing lead or other toxic compound and may also be in a condition wherein the paint is loose or peeling or in iminent danger of doing so. The bitter tasting component is a substance which causes an immediate sharp unpleasant taste, such as denatonium benzoate or lignocaine benzyl octanoate. Also, the bitter tasting component dissolved in a suitable solvent such as ethylene glycol, propylene glycol, water or alcohol may be added to certain suitable paints and lacquers.

More specifically, I have invented a paint which contains a relatively large amount of the deterrent bittering agent denatonium benzoate or lignocaine benzyl octanoate in combination with a resin emulsion such as polyvinyl acetate - acrylic copolymer emulsion. The range of the denatonium benzoate and lignocaine benzyl octanoate is from 0.05% to 0.5% and of the resin between 9.0 and 99.5% expressed as a percentage by weight of the non-volatile portion of the paint; i.e., the portion that remains after the paint has dried on the substrate. The resin binder, in addition to forming a film which holds the paint together to provide durability, adhesion, toughness, washability and continuity controls the amount of deterrent composition released on contact with saliva so as to insure the retention of the deterrent bittering agent over the life of the coating.

The paint further comprises a surfactant, such as nonyl phenoxy polyoxyethylene ethanol, to stabilize the emulsion and help disperse the pigment. A pigment dispersant and stabilizer is also employed to protect the paint against the chemical action of the bittering agent.

The strength and durability of the film formed by the resin binder is important is providing a paint which may be applied properly and will adhere for long periods of time to previously coated surfaces. Accordingly, an anti-foam agent is employed to prevent bubbles from forming on application and impair the uniformity and continuity of the film. A coalescing agent, such as 2,2,4 trimethylpentane diol monoisobutyrate, is also included to insure proper film formation throughout the range of normal interior room temperatures. Other suitable coalescing agents are hexylene glycol and various commercially available ethers.

In order to provide color to and provide the visual appearance of ordinary paints, hiding or opacifying pigments such as titanium dioxide or iron oxide are used together with an inert, insoluble pigment such as calcium carbonate, talc, clay or silica. These latter ingredients provide additional dry opacity and the desired degree of sheen and film thickness. A thickener is used to prevent settling of the pigment and impart the desired application properties. Examples of suitable thickeners are methyl cellulose, ethyl cellulose, hydroxyethyl cellulose, acrylate and bentonite.

Since the paint may be subjected to low temperatures during storage and shipment, an antifreeze agent such as ethylene glycol is added. Also, a non-toxic can preservative such as 2-[(hydroxymethyl)amino)] ethanol is included to prevent deterioration of the paint in the can due to bacterial attack. A viscosity stabilizer, lecithin or potassium tripolyphosphate, is additionally included.

A paint additive may also be provided comprising a solution of denatonium benzoate or lignocaine benzyl actanoate dissolved in a solution such as ethylene glycol, propylene glycol, water or alcohol. This solution may be added to a finished coating compound in order to make the compound a deterrent to children.

A paint containing an effective amount of one or more bitter tasting components which is applied to an existing coating will render the existing coating and any previously applied coating to which my paint will adhere repulsive in taste to anyone who may try to chew, suck, lick or eat the dried paint film.

The aforementioned features and advantages will become more readily apparent from the following detailed examples.

EXAMPLE I

A deterrent paint was prepared by adding to a suitable container under agitation the following ingredients expressed as parts by weight:

340 parts water.

45 parts ethylene glycol as an antifreeze agent to keep the paint from being damaged during shipment and storage.

4 parts nonyl phenoxy polyoxyethylene ethanol to stabilize the emulsion and help disperse the pigment.

6 parts Colloids 681 f (manufactured by Colloids, Inc.) to prevent bubbles from forming on application of the paint which would impair the uniformity and continuity of the film.

2 parts denatonium benzoate as the bittering agent.

5 ¼ parts methyl cellulose as a thickener to prevent settling of the pigment and provide good application properties.

2 parts 2-[(hydroxymethyl)amino] ethanol. This material acts as a non-toxic can preservative and prevents deterioration of the paint in the can due to bacterial attack.

12 parts of a 25% solution of a sodium salt of polymeric carboxylic acid. This salt acts as a pigment dispersant and stabilizer of the paint against the chemical action of the denatonium benzoate.

175 parts titanium dioxide, a hiding or opacifying pigment.

250 parts calcium carbonate to provide additional opacity and the desired degree of sheen and film thickness.

6 parts lecithin for viscosity stabilization.

12 parts 2,2,4 trimethylpentane diol monoisobutyrate as a coalescing agent to insure proper film formation throughout the range of normal interior room temperatures.

225 parts 55% solids - 45% water polyvinyl acetate - acrylic copolymer emulsion. This emulsion supplies the resin binder that forms the film holding the paint together and gives it its durability, adhesion, toughness, washability and continuity. The emulsion also controls the amount of deterrent released in contact with a child's saliva and insures the proper retention of the bittering agent over the life of the coating.

The paint, which has a flat finish common to wall paints, was tested by coating, by means of a Bird applicator, a 3 mil film on a sheet of 40 mil thick paper to simulate a thin topcoat over many old undercoats. After 24 hours drying time, a ½ × ½ inch chip of the painted paper was cut from the sheet and tasted. The resulting taste was extremely unpleasant and objectionable enough to convince the person making the test that a child chewing on a similar chip would reject it and learn not to repeat the unpleasant experience. These tests were continued over a period of several months with chips being cut off the sheet at intervals to determine how long the taste remains in the paint film. Over a period of twenty three months, a strong bitter taste still remained.

Taste tests were also run on scrubbed panels of the paint to determine if the bitter taste was still evident after the paint had been washed at least as much as the ordinary household surface. Tests run for 800 scrubs on a 2 lb. weighted Gardner Scrub Machine with a detergent-abrasive scrubbing solution showed that the scrubbed paint film still retained a bitter, repulsive taste. Aged samples of paint were periodically applied and tested similarly to determine if the taste effect is stable. Results to date have been positive.

EXAMPLE II

A deterrent paint was prepared as in Example I except that only one part by weight of denatonium benzoate was used instead of two parts. The test described in Example I was conducted with similar results.

EXAMPLE III

A deterrent paint was prepared as in Example I except that the two parts of denatonium benzoate were dissolved in ten parts of the ethylene glycol and the resulting solution was added as the last ingredient in the composition. The mixing was continued for five minutes after the last addition. Tests were conducted as in Example I with similar results.

EXAMPLE IV

A deterrent paint prepared as in Example III has only one part of denatonium benzoate dissolved in five parts of the ethylene glycol. Also, a deterrent paint prepared as in Example I has only one-half part of denatonium benzoate. Test results similar to those of Example I are obtained.

EXAMPLE V

A deterrent paint was prepared by adding in a suitable container under agitation: (All parts are by weight)
100 parts Water
6 parts Colloids 681 f
2 parts Denatonium benzoate
4 parts Nonyl phenoxy polyoxyethylene ethanol
1.5 parts Methyl Cellulose
2 parts 2-[(hydroxymethyl)amino] ethanol
10 parts A 25% solution of a sodium salt of polymeric carboxylic acid.
250 parts Titanium Dioxide
400 parts Acrylic Latex Emulsion (45% non-volatile)
180 parts Polyvinyl Acetate - Acrylic Latex Emulsion (55% non-volatile)
130 parts Propylene Glycol The same tests were done as in Example I with similar results.

EXAMPLE VI

Deterrent paints are prepared as in Example V wherein only one part of denatonium benzoate and one-half part denatonium benzoate are used. Test results were as in Example I.

EXAMPLE VII

Deterrent paints with one-half part and one part denatonium benzoate respectively are prepared as in Example V but the denatonium benzoate is dissolved in 5 times its own weight of ethylene glycol and the resulting solution is added as the last ingredient in the composition. The agitation is then continued for five minutes after the last addition. Again, the test results were consistent with those of Example I.

EXAMPLE VIII

A deterrent paint was prepared as in Example III except that 2 parts of lignocaine benzyl octanoate were dissolved in ten parts of the ethylene glycol and the resulting solution was added as the last ingredient in the composition. The mixing was continued for five minutes after the last addition. The tests described in Example I were conducted with similar results.

What is claimed is:

1. A coating composition for application to previously coated substrates consisting essentially of a paint containing 0.05% to 0.5% by weight of the non-volatile portion of said paint of the bitter tasting deterrent denatonium benzoate; 9.0% to 99.5% by weight of a resin binder selected from the group consisting of at least one of ppolyvinyl acetate-acrylic copolymer latex and a mixture of polyvinyl acetate-acrylic copolymer latex and acrylic latex for controlling the amount of said deterrent released on contact with saliva; and an effective amount of a surfactant for stabilization of said paint, said coating composition having the visual appearance, durability, adhesion, toughness, washability and continuity of conventional paint and having a repulsive taste which discourages persons from licking, sucking, chewing, swallowing or otherwise mouthing said substrates.

2. A coating composition as defined by claim 1 wherein said surfactant is nonyl phenoxy polyoxyethylene ethanol.

3. A coating composition as defined by claim 1 which further contains effective amounts of an anti-foam agent and a coalescing agent, said anti-foam and coalescing agents providing proper film formation.

4. A coating composition as defined by claim 3 wherein said coalescing agent is 2, 2, 4 trimethylpentane diol monoisobutyrate.

5. A coating composition as defined by claim 1 which further contains effective amounts of an opacifying pigment to provide the visual appearance of ordinary paint and a thickener to prevent settling of said pigment.

6. A coating composition as defined by claim 5 wherein said thickener is methyl cellulose.

7. A coating composition as defined by claim 1 which further contains effective amounts of an antifreeze agent to protect said paint against exposure to low temperatures and a non-toxic preservative to prevent deterioration of the paint due to bacterial attack.

8. A coating composition as defined by claim 7 wherein said antifreeze agent is ethylene glycol and said preservative is 2-[(hydroxymethyl)amino] ethanol.

9. A coating composition for application to previously coated substrates consisting essentially of a paint containing 0.05% to 0.5% by weight of the non-volatile portion of said paint of the bitter tasting deterrent denatonium benzoate, 9.0% to 99.5% by weight of a resin binder selected from the group consisting of at least one of polyvinyl acetate-acrylic copolymer latex and a mixture of polyvinyl acetate-acrylic copolymer latex and acrylic latex for controlling the amount of said deterrent released on contact with saliva; and effective amounts of nonyl phenoxy polyoxyethylene ethanol for stabilization of said paint, 2, 2, 4 trimethylpentane diol monoisobutyrate as a film former, and ethylene glycol to protect said paint against exposure to low temperature, said coating composition having the visual appearance, durability, adhesion, toughness, washability and continuity of conventional paint and having a repulsive taste which discourages persons from licking, sucking, chewing, swallowing or otherwise mouthing said substrates.

10. A paint additive consisting essentially of a solution of an effective amount of the bitter tasting deterrent denatonium benzoate and a solvent, said paint additive when added to a coating compound providing a product having the visual appearance of conventional paint and having a repulsive taste which discourages person from licking, sucking, chewing, swallowing or otherwise mouthing said substrates.

11. A paint additive as defined by claim 10 wherein said solvent is selected from the group consisting of ethylene glycol, propylene glycol, water and alcohol.

* * * * *